INVENTOR
JOSEPH K. PARK
BYRON K. WEBB

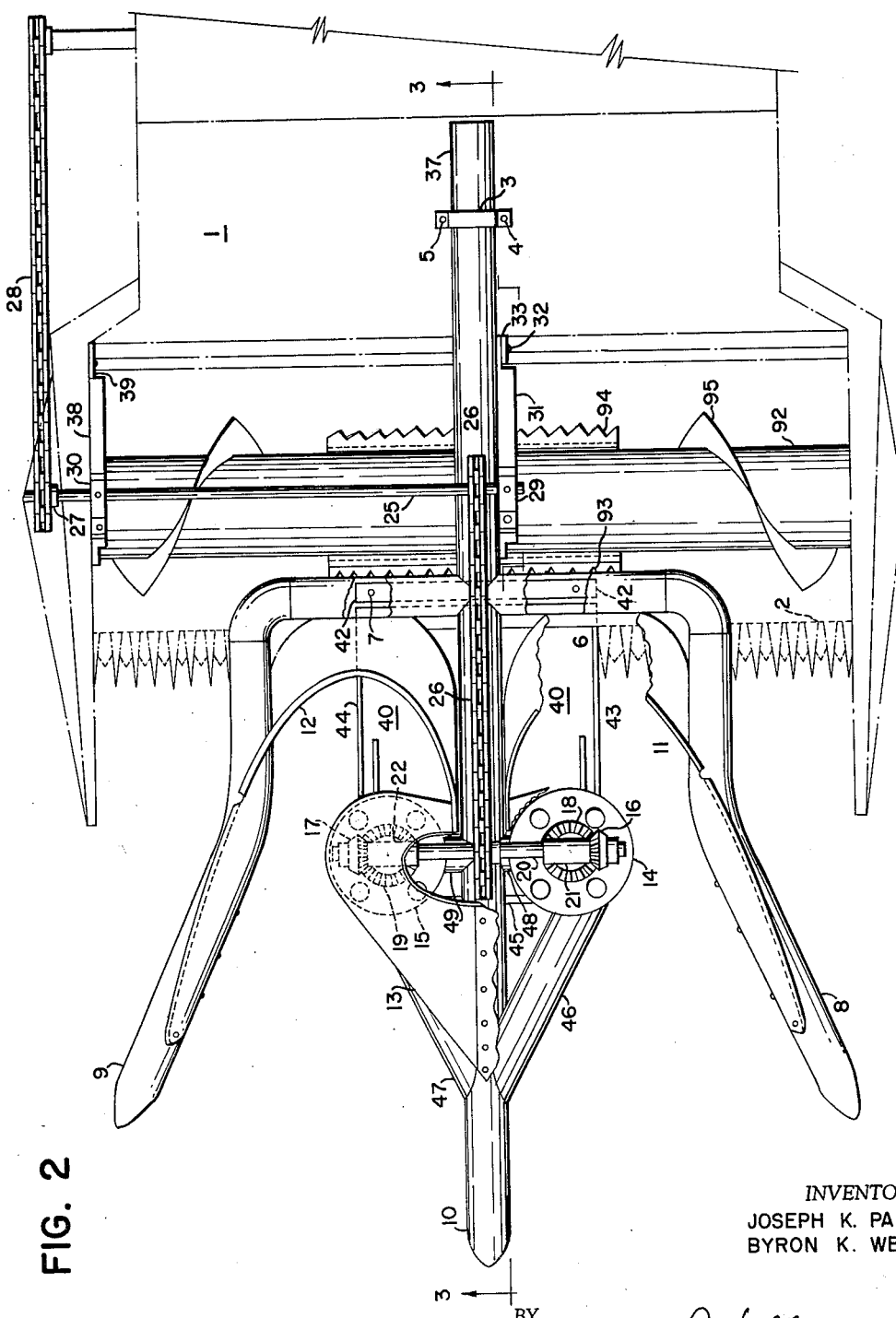

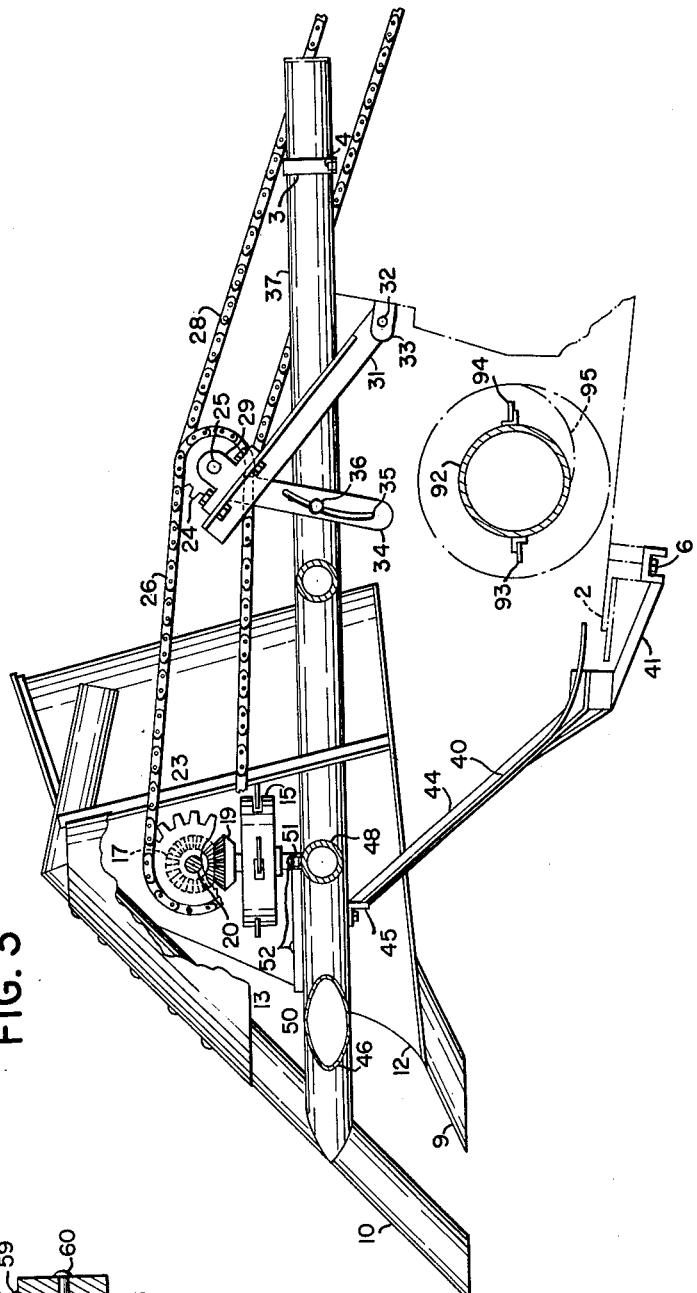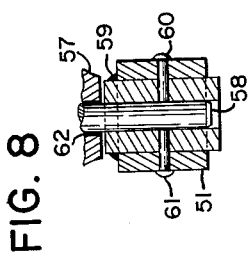

Nov. 10, 1964   J. K. PARK ETAL   3,156,079
CORN HEADER ATTACHMENT
Filed April 3, 1963   5 Sheets-Sheet 4

INVENTOR.
JOSEPH K. PARK
BYRON K. WEBB
BY
R. Hoffman
ATTORNEY

Nov. 10, 1964    J. K. PARK ETAL    3,156,079
CORN HEADER ATTACHMENT

Filed April 3, 1963    5 Sheets-Sheet 5

INVENTOR
JOSEPH K. PARK
BYRON K. WEBB

BY R. Hoffman
ATTORNEY

United States Patent Office 3,156,079
Patented Nov. 10, 1964

3,156,079
CORN HEADER ATTACHMENT
Joseph K. Park and Byron K. Webb, Clemson, S.C., assignors to the United States of America as represented by the Secretary of Agriculture
Filed Apr. 3, 1963, Ser. No. 270,481
3 Claims. (Cl. 56—2)

A non-exclusive, irrevocable, royalty-free license in the invention herein described throughout the world for all purposes of the United States Government, with the power to grant sub-licenses for such purposes, is hereby granted to the Government of the United States of America.

This invention relates to a corn header attachment. More particularly, it relates to an attachment for a grain combine for mechanically harvesting corn.

The current practice in harvesting corn with a grain combine is to remove the entire grain header (which cuts the grain and feeds it to the cylinder) and replace it with a corn header attachment. These corn header attachments are relatively complex and expensive.

It is therefore one object of this invention to provide a mechanically simplified corn header attachment for a grain combine. Another object is to provide a corn header attachment which can be mounted directly on the standard grain header itself without the necessity of first removing the latter. Other objects will become apparent to those skilled in the art from the following description and the accompanying drawings in which:

FIGURE 2 is a plan view of the attachment, with parts broken away, further showing the manner of attachment to the standard grain header;

FIGURE 3 is a side elevation in cross section taken on line 3—3 of FIGURE 2;

FIGURE 8 is a section taken on line 8—8 of FIGURE 7 showing the manner of mounting the mechanism.

Figure 1:
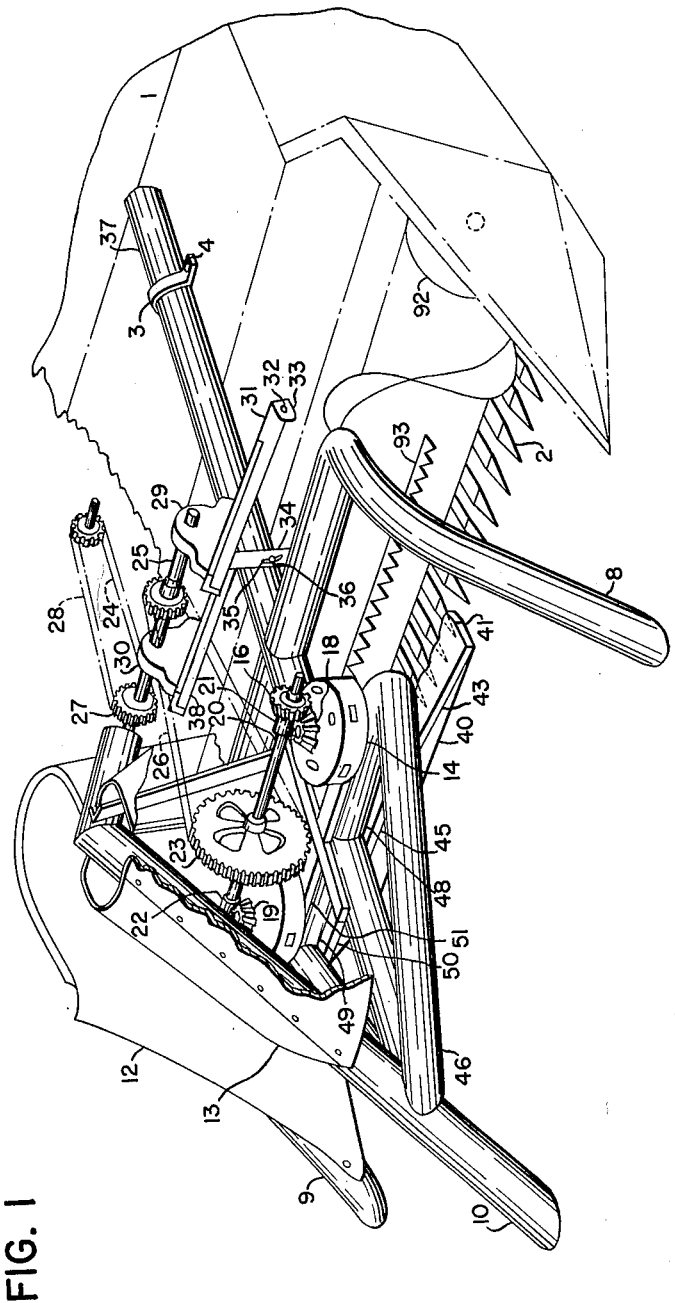
FIGURE 1 is a perspective view of the novel corn header attachment, with parts cut away, showing its construction and relationship to the old combine.

In FIGURES 1 to 3, with the exception of the grain header main feed drum, those portions of the conventional grain header on the combine to which the corn header is attached are shown dotted to distinguish the old elements from the novel attachment.

In general, the attachment comprises a means for gathering the corn stalks into the header and for guiding them into position over the cutterbar of the combine.

Referring particularly to FIGURES 1 to 3, the top of the conventional grain header is represented generally by 1 and the cutterbar by 2. It is to these elements that the novel corn header is attached. Thus, as seen in FIGURES 1 to 3, the corn header is held by clamp 3 which is secured to the top of the grain header 1 by means of bolts 4 and 5 and to the bottom of cutterbar 2 by means of bolts 6 and 7.

As seen from FIGURES 1–3, the novel header itself comprises side support members 8 and 9, front support member 10, main shields 11 and 12, and feed cylinder shield 13 of feed cylinders 14 and 15. Side support members 8 and 9 and front support member 10 constitute the rigid framework of the attachment and are secured, as by welding, to main longitudinal central support member 37. Shields 11, 12, and 13 are contoured metal plates and are secured to the support members, as shown, in any suitable manner as by riveting or bolting. The side support members extend transversely from their points of attachment, then in a forward direction at right angles, and finally flare outward and downward. The shields are so contoured that, when the machine travels forward in the direction of the arrow on FIGURE 2, the standing corn stalks first enter a horn-shaped opening of rearwardly decreasing width and are forced into a rearwardly and downwardly extending, outwardly flared, enlarged opening and over the cutterbar of the combine by means of disappearing finger feed cylinders 14 and 15.

Feed cylinders 14 and 15 are driven by gears 16 and 17 through gears 18 and 19, respectively. Gears 16 and 17 are mounted at the opposite ends of shaft 20 which extends transversely to the central support member and which is journalled in bearings 21 and 22.

The manner in which bearings 21 and 22 are mounted will be described in detail in a subsequent portion of this specification.

Power is supplied to shaft 20 through sprocket wheel 23, which is secured to the shaft in any conventional manner, then through sprocket wheel 24, mounted on countershaft 25, and finally through chain 26 which passes over sprockets 23 and 24. Countershaft 25 is driven by means of sprocket 27 and chain 28 from any power take-off available on a particular combine.

Countershaft 25 is journalled in bearings 29 and 30. Bearing 29 is mounted on adjustable bracket 31 which is pivotally mounted at one end on the combine's header 1 by means of pin 32 and lug 33. Bracket 31 is maintained in the desired position by means of slotted bar 34, secured in any suitable manner to the bracket, as by welding and provided with a slot 35 adapted to engage bolt 36 threaded into longitudinal support member 37.

Bearing 30 is mounted in a similar manner on bracket 38 which is pivotally secured by means of pin 39 to the side framework of the combine header.

The corn header attachment is further supported by means of support shield 40 which comprises a generally rectangular baffle rigidly secured near its lower end by a pair of braces 41 to the bottom of cutterbar 2. This is accomplished by rigidly securing the braces 41 to a transverse channel member 42 which, in turn is fastened to the bottom of the cutterbar assembly by means of bolts 6 and 7. As can be seen from FIGURE 3, the lower edge 96 of the shield extends over the sickle of the cutterbar and serves as a guard. Shield 40 is itself kept rigid by means of a framework comprising sides 43, 44, and 45, the latter being bolted to bracing members 46 and 47. Bracing members 46 and 47, which are preferably tubular, are secured, as by welding, to front support member 10 and to transverse feed cylinder support members 48 and 49. These transverse support members are secured to longitudinal support member 37. The latter serves as a main frame member which, together with support shield 40 and its framework, supports and provides rigidity to the corn header attachment assembly.

Members 37, 48, and 49 also serve to support the disappearing-finger feed cylinder assembly of the attachment. This assembly, which comprises the two cylinders 14 and 15 and its immediate driving mechanism is mounted on a T-shaped support member which is a unitary structure and is made of square tubing. T-shaped member consists of a leg 50 and a transverse member 51, a part of the latter being shown in section in FIGURE 3 and completely in FIGURE 1, and is secured to support members 37, 48, and 49 by means of bolts 52, or in any other suitable manner.

Although the disappearing-finger feed cylinders are themselves not new, their operation and construction will now be described in detail to permit a complete understanding of the construction and operation of the corn header.

Figure 4:
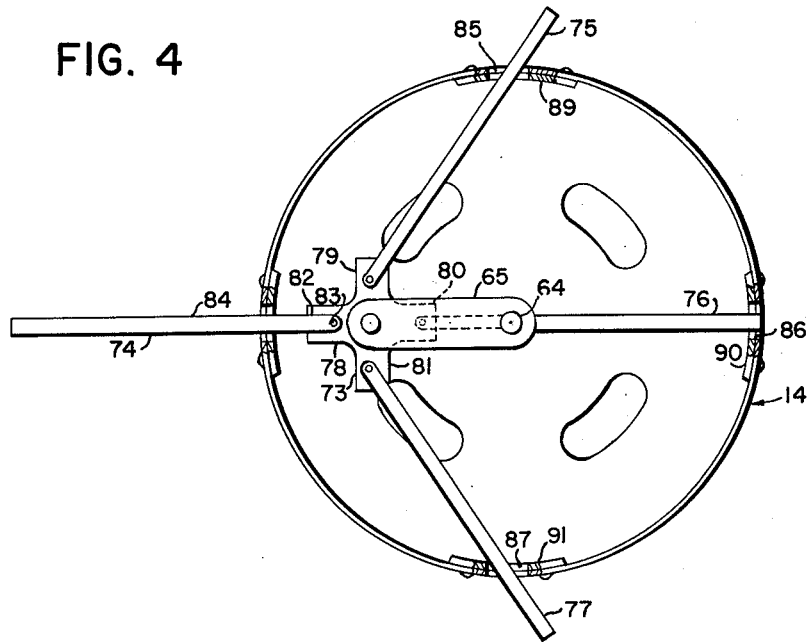
FIGURE 4 shows the disappearing finger unit, with its cover removed, used to force the corn stalks over the cutterbar of the combine.
Figure 7:
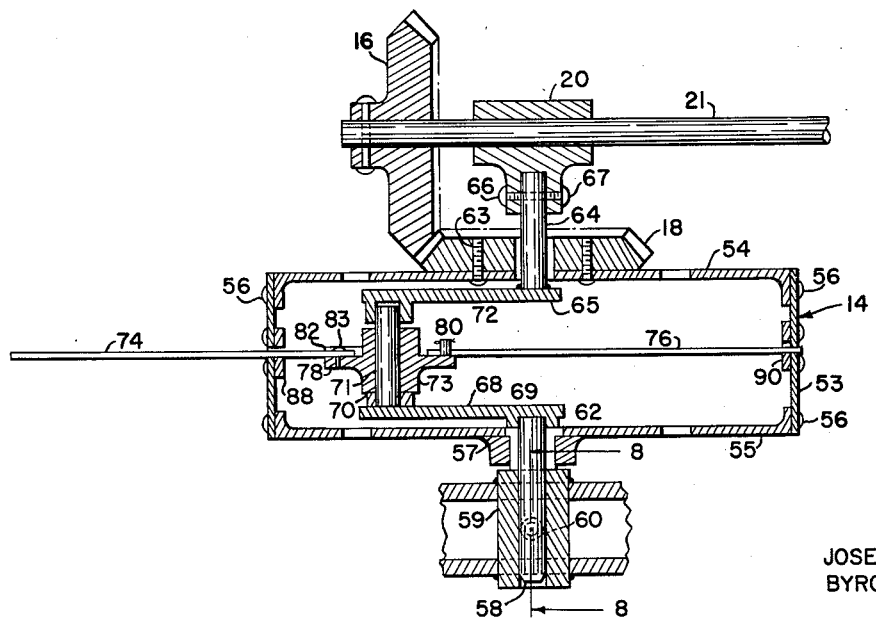
FIGURE 7 is a section, in elevation, taken on line 7—7 of FIGURE 6, showing details of internal structure and method of operation.

Referring to FIGURES 4 and 7, it is seen that the feed cylinder assembly comprises a cylindrical member 53 provided with a cover plate 54 and a bottom plate 55. Plates 54 and 55 are each secured to cylindrical member 53, preferably by means of screws 56, so that they can be easily removed. Bottom plate 55 is provided at its center with an axially-located hub 57 which may either be made integral therewith or secured thereto in any suitable manner. The entire assembly is mounted to be freely rotatable about pin 58 which is rigidly secured in bushing 59. The latter is itself mounted in T-shaped support member 51 and is welded thereto to prevent rotation. Pin 58 is prevented from rotating by means of set screws 60 and 61 which pass through both T-shaped support member 51 and bushing 59. A bushing 62, inserted in hub 57, serves as a bearing for rotation of member 14 about pin 58.

At the top of the cylindrical member, bevel gear 18 is secured to cover plate 54, coaxially with cylindrical member 53, by any suitable means, such as screws 63. An axial pin 64 extends through the central hole of gear 18 and is welded at its lower end to arm 65 inside the cylinder. Bearing 21, previously described, is secured to the upper end of pin 64 by means of set screws 66 and 67, thereby preventing rotation of pin 64 and arm 65. A second arm 68, generally similar to arm 65, is provided at one end with a hub 69 for mounting on pin 58. Arm 68 is also provided with a second hub 70 at its other end which serves as a bearing and support for the lower end of pin 71. The upper arm 65 is also provided with a hub 72 which serves as a bearing and support for the upper end of pin 71. It will, therefore, be apparent that, because arm 65 is welded to pin 64 which in turn is prevented from rotating by means of set screws 66 and 67 through bearing 21, both arms 65 and 68, as well as pin 71, cannot rotate about the axis of the cylindrical member and remain stationary. It will be further apparent that rotation of shaft 20 and gear 16 will cause only the outer cylindrical container to rotate.

Mounted on pin 71 to be freely rotatable is a four-spoke member 73 having spokes 78, 79, 80, and 81 and elongated fingers 74, 75, 76, and 77, respectively fastened to the spokes. Spoke 78 is provided with a channel 82 into which one end of finger 74 fits. This channel, together with rivet 83, holds finger 74 rigid. However, remaining fingers 75, 76, and 77 are pivotally mounted on their respective spokes to be freely rotatable in the plane of their longitudinal axes.

Fingers 74, 75, 76, and 77 extend through the sides of cylinder 53 through slots 84, 85, 86, and 87, and slotted guides 88, 89, 90, and 91, respectively, located 90° apart. As can be seen from the position of finger 76 in FIGURES 4 and 7, the fingers are each long enough to extend a short distance beyond the outer surface of cylinder 53 when retracted their maximum distance inside the cylinder. The purpose of this is to prevent a finger from becoming "lost" inside the cylinder when in its maximum retracted position.

Figure 5:
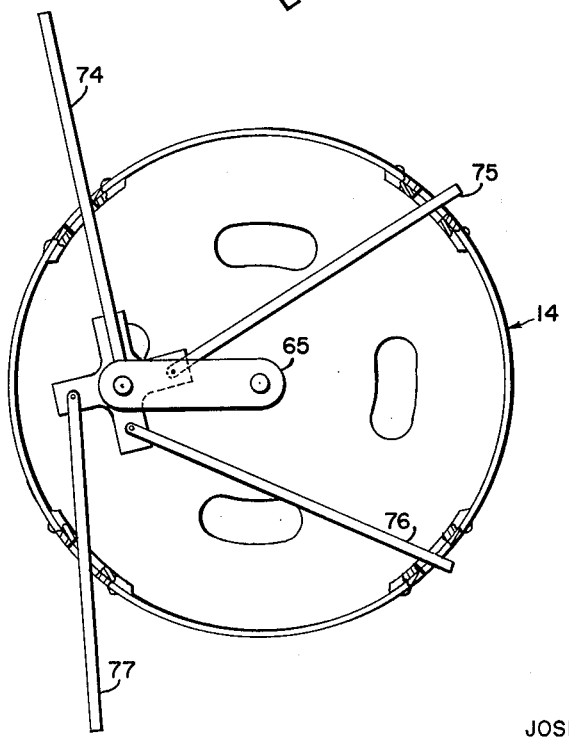
FIGURE 5 shows the mechanism of FIGURE 4 rotated 45° to illustrate the gathering action of the fingers.
Figure 6:
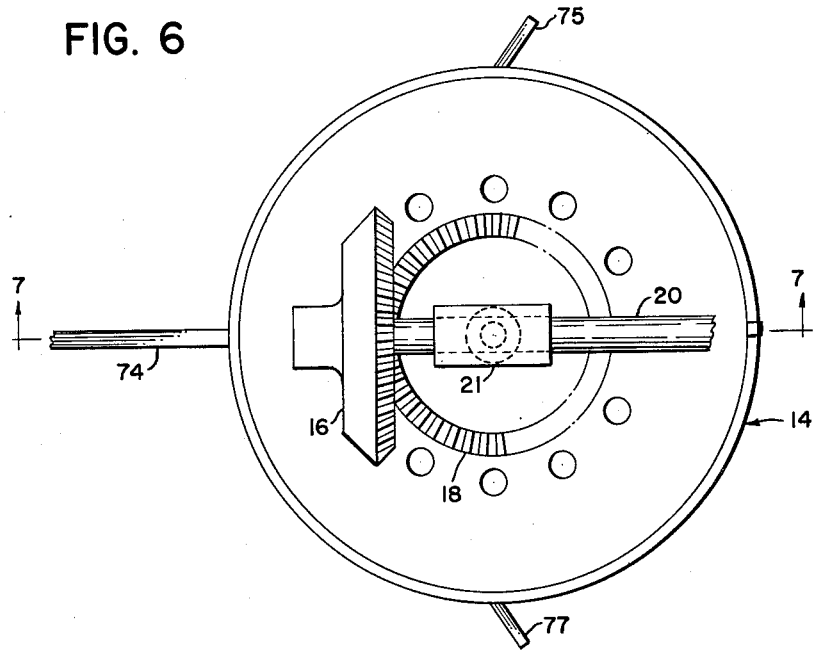
FIGURE 6 is a plan view of the disappearing finger mechanism showing how it is driven.

FIGURE 5 shows the position assumed by the fingers when the cylinder has rotated 45° in the direction indicated by the arrow. Thus, as will be apparent, the fingers are caused to perform a sweeping or "gathering" movement as cylinder 53 rotates and to vary in position from maximum extension to maximum retraction (i.e., to "disappear") each successive 180° rotation of the cylinder.

As the combine, with the novel corn header attached, moves forward, stalks are guided into position by side support members 8 and 9, front support member 10, main shields 11 and 12, and feed cylinder shield 13. The stalks are then moved backward and toward the center by the fingers on cylinders 14 and 15. This action takes place while the stalks are being severed by cutterbar 2. The supplemental force provided by the disappearing fingers is necessary to move the stalks over the cutterbar.

After the stalks have been severed by the cutterbar and move backward and inward, the butts move backward toward the combine's feed drum 92. Notched strips 93 and 94, attached to drum 92, grasp the butts and pull the stalks, butt-first, into feed drum 92 and into engagement with auger 95 on the drum. As the stalks are fed into the combine, the ears and stalks fall forward onto support shield 40 which prevents the ears from falling to the ground.

From this point on, the stalks are handled by the combine in the usual manner.

Having described our invention, what we now claim is as follows:

1. A corn header attachment for a grain combine having a cutterbar and a feed drum, said attachment comprising:
    (a) an elongated central rigid support member;
    (b) rotary feed means on said central support member for forcing standing corn stalks over the cutterbar of said combine; and
    (c) guide means on said central support member for guiding standing corn stalks into contact with said rotary feed means and for guiding cut stalks into contact with the feed drum of the combine, said guide means comprising first and second rigid side support members secured to the elongated rigid central support member and extending outwardly and downwardly on both sides thereof, a front support member secured to the elongated central support member, a first contoured plate secured to the front support member, and second and third contoured plates secured to the side support members and to the elongated central support member, said second and third contoured plates together with said first contoured plate defining a pair of similar continuous passageways for guiding cut corn stalks into contact with the rotary feed means and the feed drum of the combine such that each passageway comprises a horn-shaped opening of rearwardly decreasing width followed by a downwardly extending, outwardly flared, enlarged opening extending to the cutterbar.

2. In combination with a grain combine having a cutterbar, a grain header, and a main feed drum, a corn header attachment comprising:
    (a) an elongated rigid central support member extending forward from the grain header;
    (b) means for securing the central support member to a forward portion of the grain header;
    (c) rotary feed means mounted on the central support member at a point intermediate its ends for forcing standing corn stalks over the cutterbar of the combine;
    (d) guide means on said central support member for guiding standing corn stalks into contact with said rotary feed means and for guiding cut stalks into contact with the main feed drum of the combine, said guide means comprising first and second rigid side support members secured to the central support member and extending outwardly and downwardly on both sides thereof in a forward direction, a front support member secured to the central support member, a first contoured plate secured to the front support member, and second and third contoured plates secured to the side support members and to the central support member, said second and third contoured plates together with said first contoured plate defining a pair of passageways for guiding corn stalks into contact with the rotary feed means and the main feed drum of the combine such that each passageway comprises a horn-shaped opening of rearwardly decreasing width followed by a downwardly extending, outwardly flared, enlarged opening extending to the cutterbar; and (e) means for supplying power to the rotary feed means.

3. The machine of claim 2 wherein the rotary feed means comprises a pair of interconnected disappearing finger mechanisms symmetrically mounted on and transversely disposed to the longitudinal axis of the central support member.

References Cited in the file of this patent

UNITED STATES PATENTS

| | | |
|---|---|---|
| 2,518,732 | Tuft | Aug. 15, 1950 |
| 2,612,017 | Jarmin | Sept. 30, 1952 |
| 2,948,100 | McEachern | Aug. 9, 1960 |
| 3,096,605 | Claas | July 9, 1963 |

FOREIGN PATENTS

| | | |
|---|---|---|
| 408,250 | Great Britain | Apr. 4, 1934 |